United States Patent [19]

Hait

[11] Patent Number: 4,489,706
[45] Date of Patent: Dec. 25, 1984

[54] MULTI-PURPOSE FUEL EFFICIENT PORTABLE STOVE/HEATER

[75] Inventor: Paul W. Hait, Los Gatos, Calif.

[73] Assignee: Pyromid, Inc., Saratoga, Calif.

[21] Appl. No.: 378,111

[22] Filed: May 14, 1982

Related U.S. Application Data

[63] Continuation-in-part of Ser. No. 296,879, Aug. 27, 1981, abandoned.

[51] Int. Cl.³ .............................................. F24C 1/16
[52] U.S. Cl. .................................. 126/9 R; 126/1 D; 126/25 R; 126/9 B; 126/55
[58] Field of Search ............ 126/122, 1 D, 1 E, 25 R, 126/29, 26, 9 B, 9 R, 5, 55, 38, 37 B, 54, 20, 277, 182, 152 B, 152 A, 152 R; 99/339, 340, 450

[56] References Cited

U.S. PATENT DOCUMENTS

| | | | |
|---|---|---|---|
| 1,156,773 | 10/1915 | Gordon | 126/9 R |
| 1,238,142 | 8/1917 | Hitchcock | 126/9 R |
| 1,438,345 | 12/1922 | Tait et al. | 126/9 R |
| 2,119,799 | 6/1938 | Sivey | 126/9 R |
| 2,576,750 | 11/1951 | Clark | 126/9 R |
| 2,943,557 | 7/1960 | Suehlsen | 126/9 A |
| 3,384,066 | 5/1968 | Tufts | 126/9 R |
| 3,489,131 | 1/1970 | Richins | 126/9 R |
| 3,682,154 | 8/1972 | Mollere | 126/9 A |
| 3,809,051 | 5/1974 | Giroux | 126/9 R |
| 3,880,139 | 4/1975 | Young | 126/9 R |
| 4,211,206 | 7/1980 | Darbo | 126/9 R |

Primary Examiner—Randall L. Green
Attorney, Agent, or Firm—W. William Ritt, Jr.

[57] ABSTRACT

A multi-purpose stove/heater constructed of elements that are readily assembled by hand at a chosen use site, and then easily disassembled and stowed in a compact manner to facilitate portability. The elements can be put together into several different combinations to provide units for a variety of cooking, smoking, heating and drying functions, and each unit utilizes fuel in a highly efficient manner and fulfills current safety requirements as well as those for the protection of the environment wherein the unit is used.

27 Claims, 19 Drawing Figures

Fig-1 fig_3 fig-4 fig-5 fig-6 fig-7 fig-8 fig-9

MULTI-PURPOSE FUEL EFFICIENT PORTABLE STOVE/HEATER

CROSS-REFERENCE TO RELATED APPLICATION

This application is a continuation-in-part of application Ser. No. 296,879, filed Aug. 27, 1981, now abandoned.

BACKGROUND OF THE INVENTION

This invention relates to stoves and heaters, and more particularly to natural fuel-fired portable stoves and heaters that can be assembled and disassembled without the need for special tools.

The prior art is replete with various types of portable stoves and heaters that can be partially disassembled, folded, or otherwise reduced in size to enhance their portability. The use of these devices, however, is commonly fraught with problems and/or disadvantages. For example, some of the stoves or heaters of this general type are undesirably bulky and/or heavy, some require the use of tools, and occasionally specially designed tools, to assemble and disassemble their component parts, and some fall short in the strength and rigidity necessary for their intended use.

Additional disadvantages with prior art stoves or heaters of the portable variety are those encountered when these devices are used in the outdoors. The modern emphasis on protection and conservation of our natural resources and environment has produced many necessary regulations, some very stringent, that severely limit the times and locations where portable stoves or heaters can be legally and safely used, and in an ever-growing number of areas the supply of natural fuel is either seriously limited or non-existent, thereby necessitating the use of butane and other liquid or synthetic fuels that must be transported to the use site, and their empty containers returned for refilling or proper disposal.

SUMMARY OF THE INVENTION

The foregoing problems and disadvantages associated with the prior cooking and/or heating devices are overcome by the present invention which, broadly considered, comprises a portable stove/heater assembly having a novel pyramidal-shaped fire box that directs the heat to locations wherein it can be utilized for cooking, smoking, and various heating purposes to the maximum extent, that requires an unusually small amount of natural or other fuel to provide the needed heat, and that is safe for use in all areas where fire hazards are present.

More specifically, in its basic form the stove/heater assembly of the present invention comprises a fire-box of truncated pyramid configuration formed by a plurality of side panels that are secured together by hinges or by an interfitting flange and slot arrangement, and a cover grill or other suitable support for cooking utensils that rests on the top edges of the side panels and extends over the rectangular opening at the top of the fire box as defined by those top edges. One of the side panels has an opening that is partially closed by a spark-arrester screen, and a slidable door that can be positioned to facilitate access to the interior of the fire box, as for adding fuel, or positioned to utilize the screened area as a control damper for the fire.

To this basic unit can be added one or more elements, or combinations of elements, to produce a unit tailored for a relatively specific use. For example, the basic unit can be positioned on a generally flat fire pan of square or rectangular shape, and this combination can be supported over a drawer-like water compartment or tray so that the heat radiating downwardly from the fire can be utilized to heat water for washing or other purposes. Further, to the basic unit can be added a second truncated pyramid-shaped unit, comprising a second generally flat and rectangular pan with a central opening commensurate with the top opening of the basic unit, four truncated pyramid-shaped side panels that are supported at the edges of the second pan for pivotal movement with respect to axes along those edges, and a four-legged support structure of truncated pyramid shape extending upwardly and inwardly from the four corners of the second pan to a bracket or second grill of square or rectangular shape that functions as an upper support for the side panels and as a support for a chimney assembly. This second unit functions as a cooking oven and/or range, a food or other item warming enclosure, and its four side panels can be used as serving and/or dining tables.

The invention further comprises a chimney assembly having a lower section that rests on and is removably attached to the aforementioned upper support, an upper section that is removably attached to and supported by the lower section, and a trap door-like chimney damper pivotally attached to the upper end of the upper chimney section. The invention also includes support legs for the upper unit side panels that can be removed from the panels and suspended inside or supported on the outside of the chimney to serve as smoking or dehydrating racks for meat, fish, and other items.

All the elements of the assemblies in accordance with the present invention are either separable, one from another, or connected in a manner that facilitates their collapse into a more compact form, so that they can be disassembled and/or collapsed by hand and compactly stowed in a manner highly desirable for storage and/or transporting, and then readily re-assembled into functional status without need for any special tools.

The invention further contemplates the inclusion of a portable table for food preparation or other general utility, having collapsable legs, a transparent top of Lexan or other suitable material, and a storage compartment for cooking utensils, etc., that is sized and otherwise structured to be removably secured to the water tray in which the rest of the stove/heater assembly can be stowed, resulting in a suitcase-like assembly that is highly satisfactory for transporting all the elements in a secure, compact and light-weight manner.

Further specifics and advantages of the present invention will become apparent from the following description and the accompanying drawings.

Figure 1:
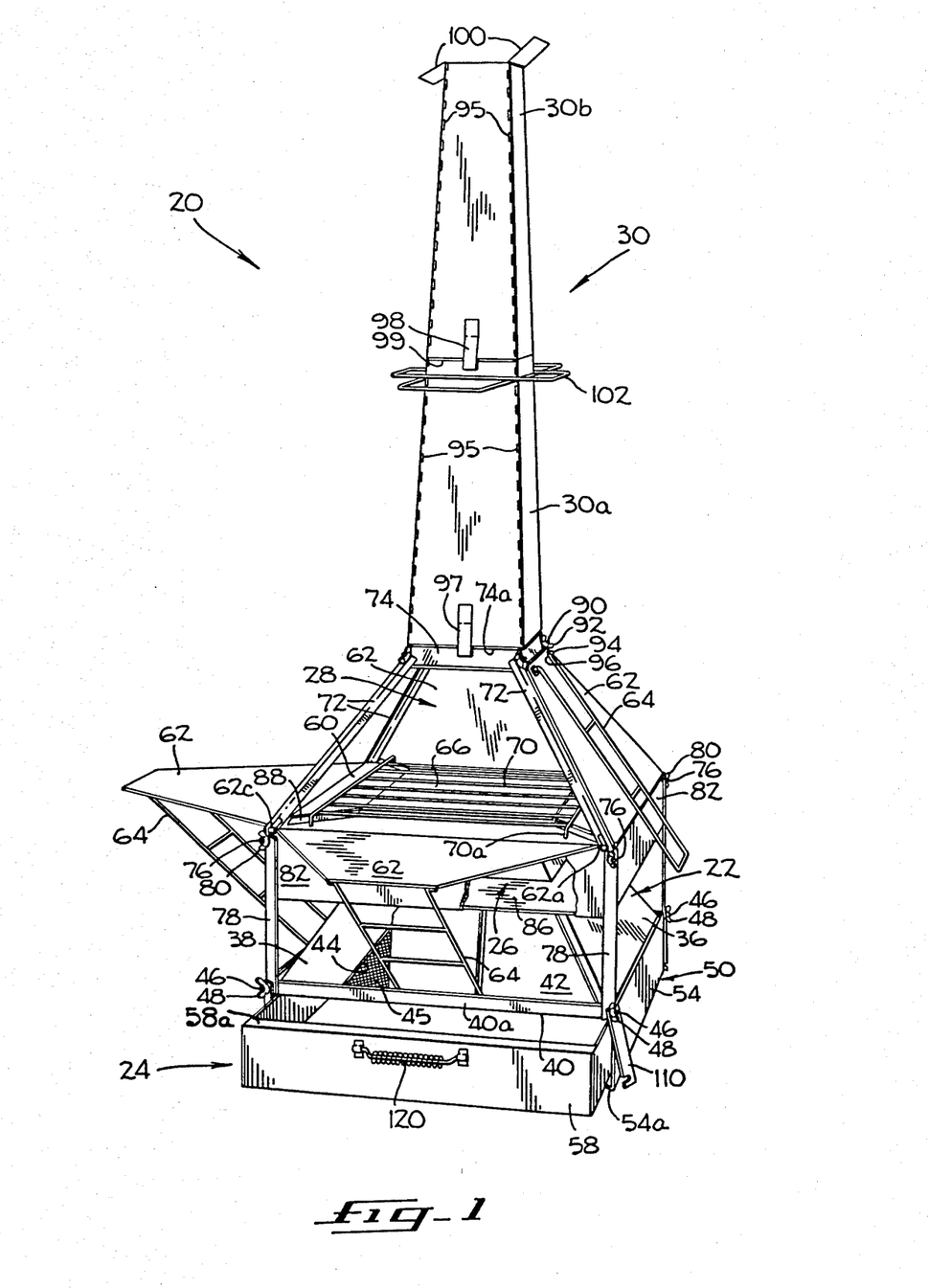
FIG. 1 is a perspective view, partially broken away, of one embodiment of a stove/heater according to the present invention, showing some of the elements in their various functional positions.
Figure 2:
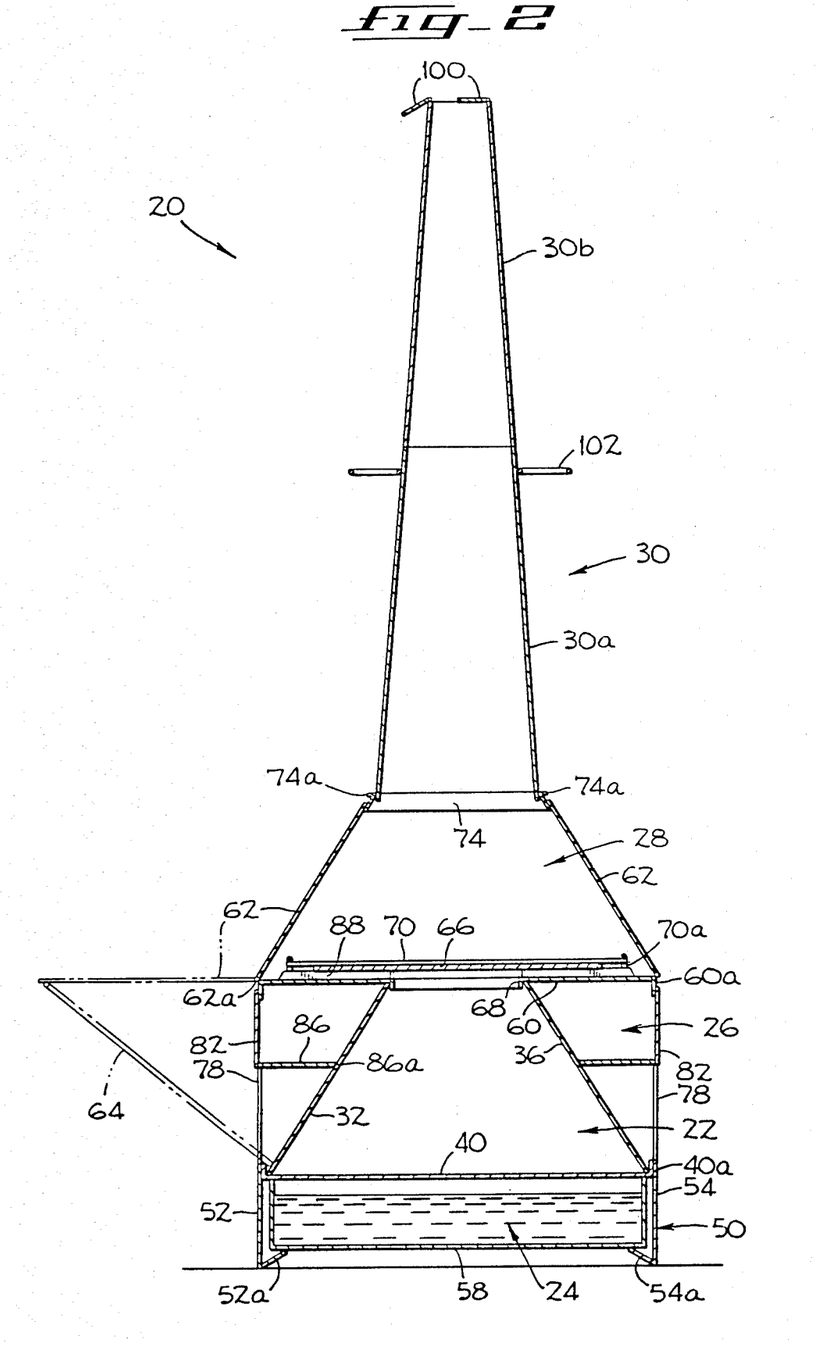
FIG. 2 is a diagrammatic vertical central section through the stove/heater of FIG. 1.
Figure 3:
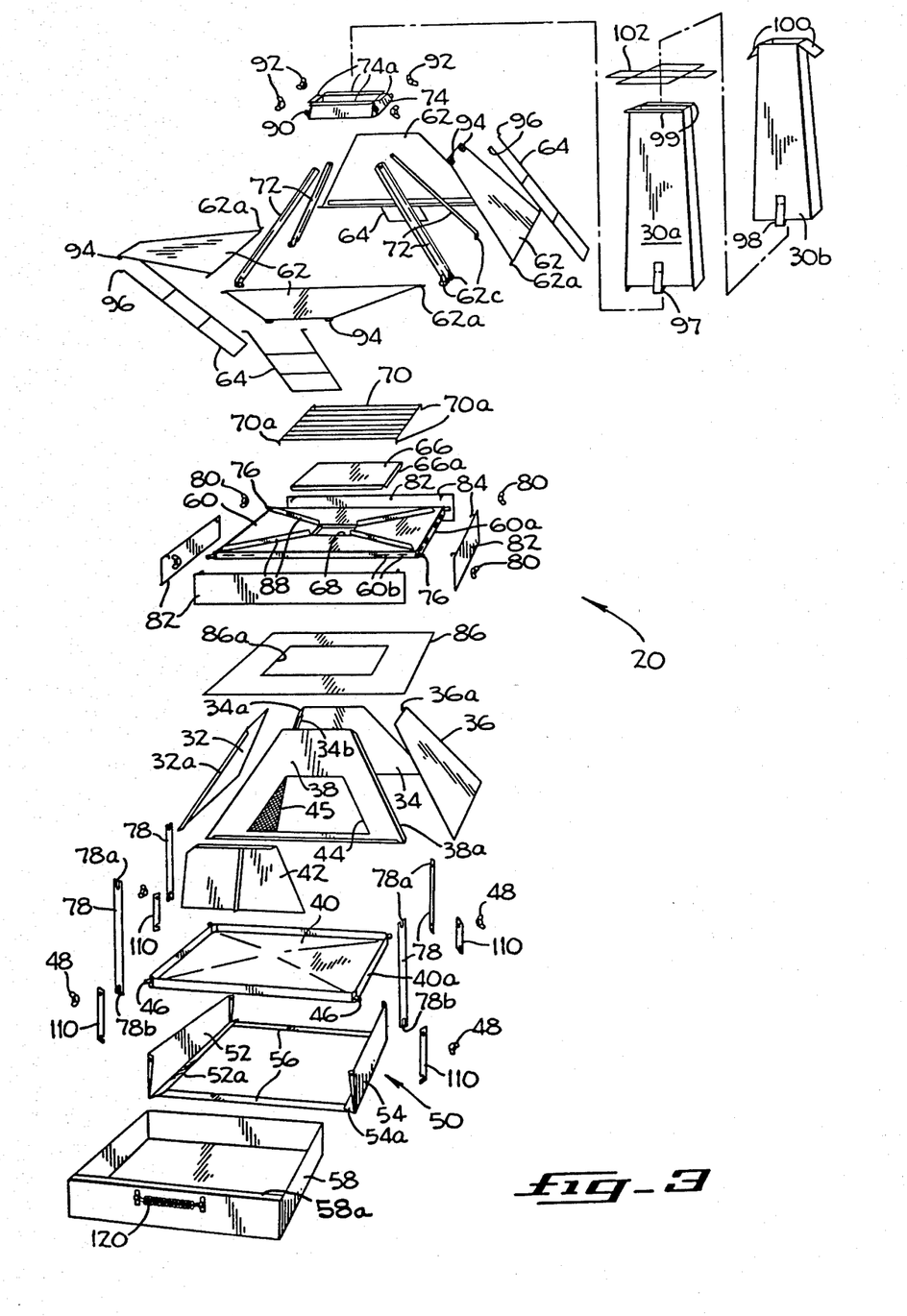
FIG. 3 is an exploded perspective view, on a reduced scale, of the stove/heater of FIG. 1.

DESCRIPTION OF THE SEVERAL EMBODIMENTS FIGS. 1–3

As illustrated in FIGS. 1, 2 and 3, one comprehensive embodiment of the present invention is a stove/heater 20 comprising a truncated pyramid-shaped fire box 22 beneath which is a rectangular water tray 24, an annular warming chamber 26 surrounding the upper portion of the fire box 22, an oven-like cooking chamber 38 residing above the warming chamber and on top of the fire box, and a chimney assembly 30 comprising lower and upper chimney sections 30a,30b respectively.

As perhaps seen best in FIG. 3, the fire box 22 comprises four side panels 32,34,36,38 of trapezoid configuration, a square or other rectangular-shaped fire pan 40, and an access/damper door 42 that is supported on the side panel 38 for back and forth sliding movement over an opening 44 in that panel. One of the two non-parallel edges of each side panel terminates in a flange 32a,34a,36a,38a, and behind each flange and parallel thereto is another flange 34b (only one shown) that cooperates with its adjacent flange, in this instance 34a, to form a slot that receives the opposed edge of the adjacent panel when the fire box is assembled. The opening 44 is partially covered at one end by a spark-arresting screen 45, so that when the door 42 is in place and the screen is exposed the opening 44 functions to allow entry of air, and when the door 42 is moved over and past the screen the other end of the opening 44 is exposed to facilitate adding fuel.

The panels 32,34,36, and 38 rest on the fire pan 40 adjacent an upstanding flange 40a at its outer perimeter, and form a truncated pyramid-shaped enclosure that directs the heat upwardly to a central opening defined by the upper edges of the panels. Projecting outward from the corners of the fire pan 40 are threaded studs 46 that are welded or otherwise fixed to the pan. In the assembled condition the studs 46 cooperate with wing nuts 48 to releasably secure the pan to a support 50 comprising two upstanding panels 52,54 joined at their lower front and rear corners by cross braces 56. The bottom edge of each panel 52,54 terminates in an inwardly and upwardly inclined flange 52a,54a, and these flanges serve as guides and supports for a drawer-like rectangular water tray 58 having an anti-splash lip 58a. Thus, the heat radiating from the bottom of the fire pan is employed to warm the water in the tray 58 for use in cooking and/or washing, rather than being lost to the earth or atmosphere.

The cooking chamber 28 comprises a rectangular tray-like base 60, four trapezoidal-shaped side panels 62 with support legs 64, a plate-like heat diffuser 66 that rests over a central opening 68 in the base 60, a cooking grill 70 with downward extending legs 70a that support it above the diffuser 66, and a side panel and chimney support structure comprising four flat struts 72 and a rectangular top support frame 74. From each of the four corners of the cooking chamber base 60 extends outwardly a threaded stud 76 that fits into a vertical slot 78a in the upper end of each of four struts 78, and wing nuts 80 releasably secure these struts to the base 60. The lower ends of the struts 78 also have slots 78b that receive the studs 46, whereby the struts releasably support the cooking chamber on the fire pan 40.

As best seen in FIG. 3, the perimeter of the base 60 includes a downwardly extending flange 60a through which extend a plurality of spaced slots 60b. Four rectangular side panels 82, each with two hook-like elements 84 that fit into mating slots 60b, are suspended from the flange 60a such that their lower edges can be swung outwardly. Between the fire pan 40 and the base 60 is an intermediate tray 86 with a central rectangular opening 86a that allows the tray 86 to be placed over the fire box 22 until it comes to rest against the panels 32,34,36 and 38 as shown best in FIGS. 2 and 3. Accordingly, the tray 86, the base 60, the fire box panels, 32,34,36 and 38, and the side panels 82 form the annular chamber 26 wherein food and/or eating utensils can be warmed or maintained so.

Upstanding from the top surface of the base 60 are four diagonal flanges 88 (FIG. 3) that function to strengthen the base and to support the diffuser 66 in proper location over the central opening 68. The perimeter of the diffuser terminates in a downwardly extending flange 66a of less width than the height of the flanges 88, so that when the diffuser is in place the flange 66a does not touch the top surface of the base 60, thereby providing a space for heat and gases to pass.

The lower ends of the four struts 72 (FIG. 3) are slotted to fit over the studs 76, and their upper ends are provided with holes through which extend threaded studs 90 that protrude from the corners of the support frame 74. Thus, the studs 76 and their wing nuts 80 cooperate to secure the struts 72 to the base 60, and the studs 90 cooperate with wing nuts 92 to secure these struts to the frame 74, all in a very sturdy and firm, yet releasable, manner.

Each of the side panels 62 is pivotally supported at its lower edge to the base 60, as for instance by laterally extending pins 62a that are received in open-top receptacles 62c (FIG. 3) which are fastened to the lower ends of the struts 72. Near the top outside edge of each panel 62 are a pair of axially aligned receptacles 94 (FIGS. 3 and 7) that receive oppositely oriented feet 96 on the ends of the legs 64. Thus, by squeezing the spring-like ends of a leg inwardly the feet can be installed or removed from the receptacles 94.

Each of the chimney sections 30a,30b (FIG. 3) is comprised of four trapezoidal panels that are pivotally interconnected, as by piano-type hinges 95 (FIG. 1), so that each section can be folded flat for compact stowage. In the assembled condition the lower ends of two opposite panels of the bottom section 30a extend down inside the frame 74, and the lower ends of the other two panels rest on two of four laterally extending flanges 74a. This arrangement permits the lower chimney section 30a to be secured to the frame 74 without regard to orientation of a given panel to a specific flange 74a. Clips 97 (only one shown) on the lower end of the section 30a releasably engage the flanges 74a to secure this section firmly to the frame 74. The upper chimney section 30b rests on top of the lower section 30a, and is similarly secured thereto by lips 98 (only one shown) that engage flanges 99 extending outward from the upper ends of the lower section 30a. A pair of damper plates 100 are pivotally attached to opposite top edges of the upper section 30b.

A very handy auxiliary element to the above described stove/heater is a frame-like support 102 (FIGS. 1-3 and 8) that fits around the lower chimney section 30a, and on which utensils or other objects can be hung.

Figure 4:
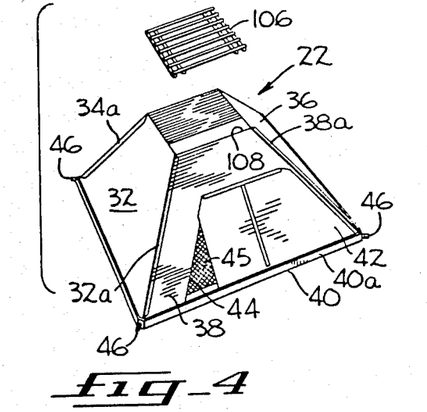
FIG. 4 is a perspective view, on a reduced scale, of another embodiment of stove/heater according to the present invention.

FIG. 4

The embodiment of stove-heater according to the present invention as shown in FIG. 4 comprises the fire box 22 plus a cooking grill 106 that fits over the opening 108 at the top of the fire box 22.

Figure 5:
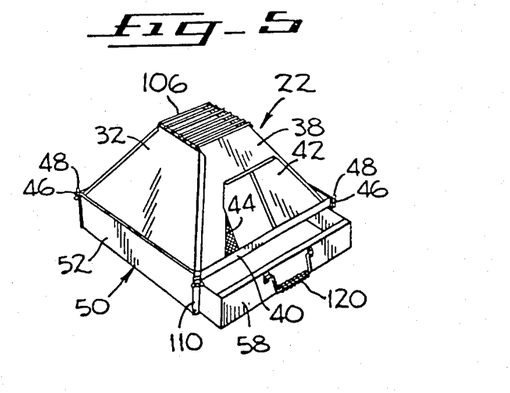
FIG. 5 is a view, like FIG. 4, of another embodiment of the present invention.

FIG. 5

The embodiment of the present invention illustrated in FIG. 5 comprises the FIG. 4 embodiment plus the water tray 58, support structure 50, and wing nuts 48.

Figures 6, 7:
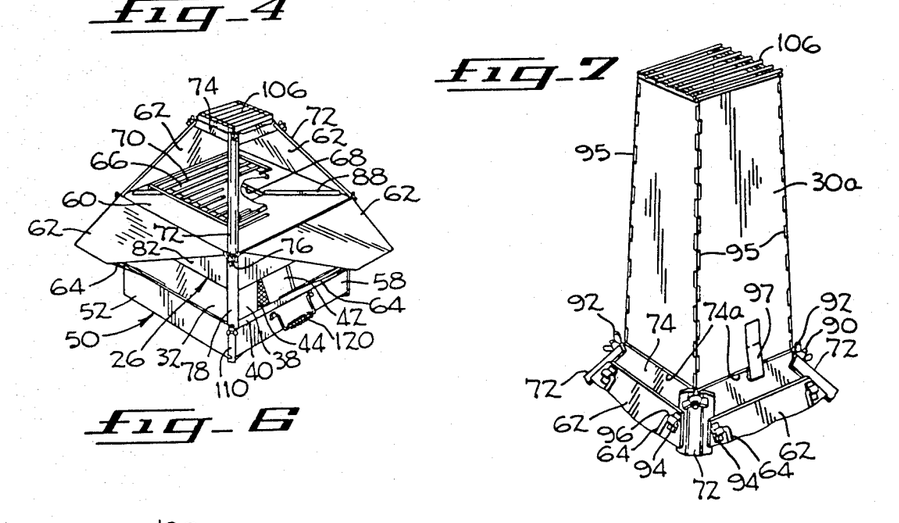
FIG. 6 is a view, like FIGS. 4 and 5, of still another embodiment of the present invention.
FIG. 7 is a fragmentary perspective view of a lower chimney section mounted on the upper bracket component of the embodiment of FIG. 6.

FIG. 6

As shown in FIG. 6, adding the warming chamber 26 and the cooking chamber 28 to the FIG. 5 embodiment creates yet a more versatile embodiment of the present invention.

FIG. 7

The embodiment of the present invention illustrated in FIG. 7 comprises the FIG. 6 embodiment plus a lower chimney section 30a. In this instance the grill 106 is positioned on top of the chimney section 30a.

Figure 8:
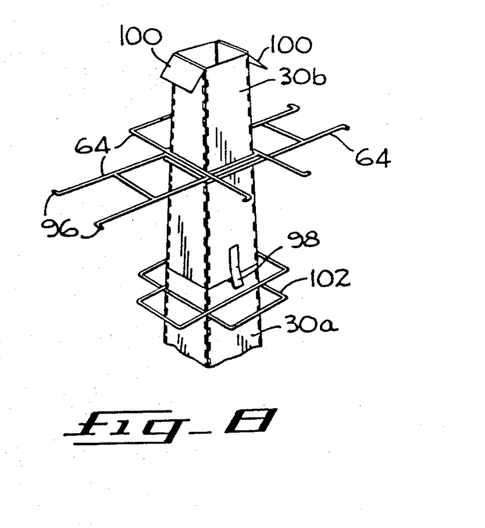
FIG. 8 is a fragmentary perspective view of the complete chimney unit, of two upper side panel legs positioned on the outside of the chimney to function as racks for utensils, clothing, etc., and a lower utility bracket similarly positioned on the chimney.
Figure 9:
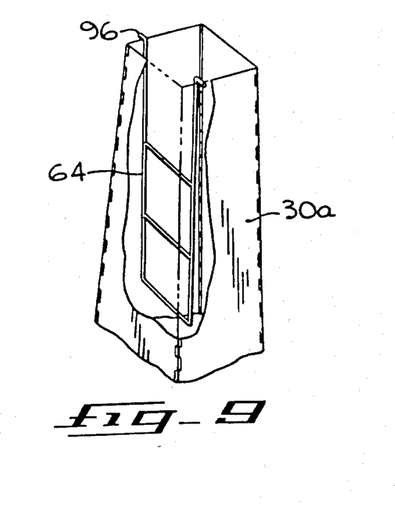
FIG. 9 is an enlarged fragmentary view of the lower chimney section in which is suspended an upper side panel leg in functional position for smoking or dehydrating use.

FIGS. 8 and 9

The legs 64 for supporting the side panels 62 are structured to also serve as racks for supporting utensils, clothing, or other objects when disengaged from their panels and installed over the upper chimney section 30b as shown in FIG. 8. Also, as illustrated in FIG. 9, these legs make very suitable racks for supporting fish or meat in the chimney for smoking purposes.

Figure 14:
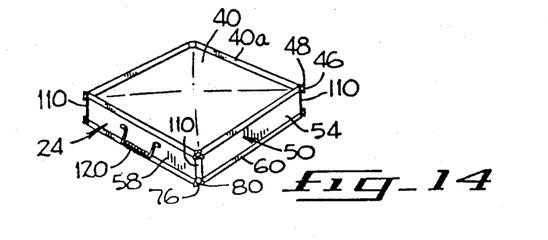
FIG. 14 is a perspective view of the present invention stove/heater in its stowed condition.

FIG. 14

In stowing the disassembled stove/heater 20, all the components except the fire pan 40 and the cooking chamber base 60 are placed in the water pan 58, and the water pan then sandwiched between the fire pan 40 and the base 60. Four short links 110 are then fastened to the lugs 46 and 76 by their wing nuts 48,80, respectively, thereby creating a compact yet sturdy and portable package as shown in FIG. 14.

Figure 10:
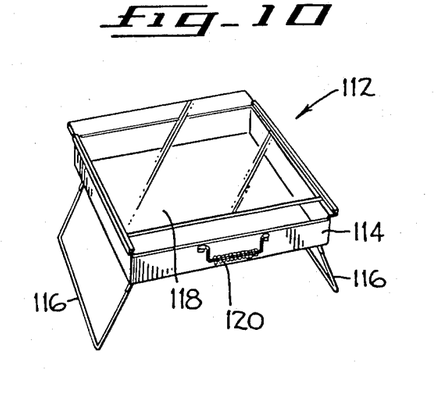
FIG. 10 is a perspective view of a form of utility table that can be employed with any embodiment of the present invention.
Figure 11:
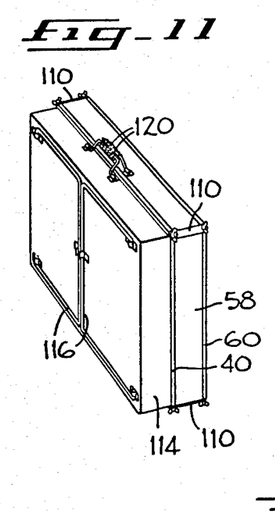
FIG. 11 is a perspective view of the table of FIG. 10 and, on a reduced scale, the disassembled and stowed stove/heater of FIG. 1, secured together into a portable, suitcase-like structure.

FIGS. 10 and 11

If desired, an auxiliary work/storage table 112 (FIG. 10) can be included with the stove/heater 20. This table comprises a drawer-like base 114 supported on folding legs 116, and a Lexan or other transparent top 118 that is slidably secured to the top of the base 114. By providing suitable clip-type fasteners (not shown), the table and the stove/heater can be releasably secured together into a suitcase-like arrangement (FIG. 11) that can be easily transported by handles 120.

Figure 12:
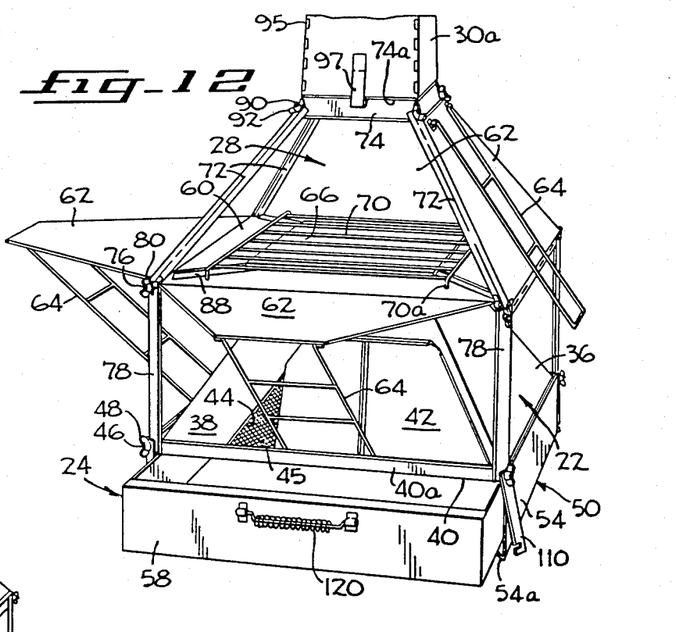
FIG. 12 is a fragmentary perspective view of another embodiment of the present invention, similar in many respects to that of FIG. 1.

FIG. 12

If the annular warming chamber 26 is not desired, the intermediate tray 86 and the side panels 82 are not included, resulting in a combination of elements as shown in FIG. 12.

Figure 13:
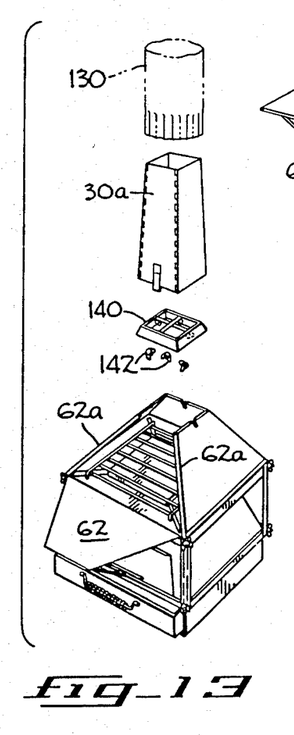
FIG. 13 is an exploded perspective of yet another embodiment of the present invention, primarily for backpacking and illustrating how, if desired, a section of conventional metal stove pipe can be fitted over the upper end of the chimney.

FIG. 13

Depending upon the size of the stove/heater, for example whether it is quite small for backpacking, relatively large for simultaneous use by a number of people, or some appropriate in-between size, various modifications can be made thereto while keeping within the spirit and scope of the invention. As illustrated in FIG. 13, if the upper end of the lower chimney section 30a is dimensioned appropriately, a conventional four inch diameter metal stove pipe 130 can be installed over the upper end of the chimney section 30a. Also, and as is generally represented in FIG. 13, three of the side panels 62 can be modified with flanges 62a so that these panels can be interfitted for self-support, whereby the struts 72 can be eliminated, and the frame 74 replaced by a frame 140 that fits over the three panels and is secured to them by thumb-screws 142. These modifications are especially suitable for a backpacking size stove/heater where each ounce of weight is a consideration, especially to the avid hiker.

Figures 15, 16, 17, 18, 19:
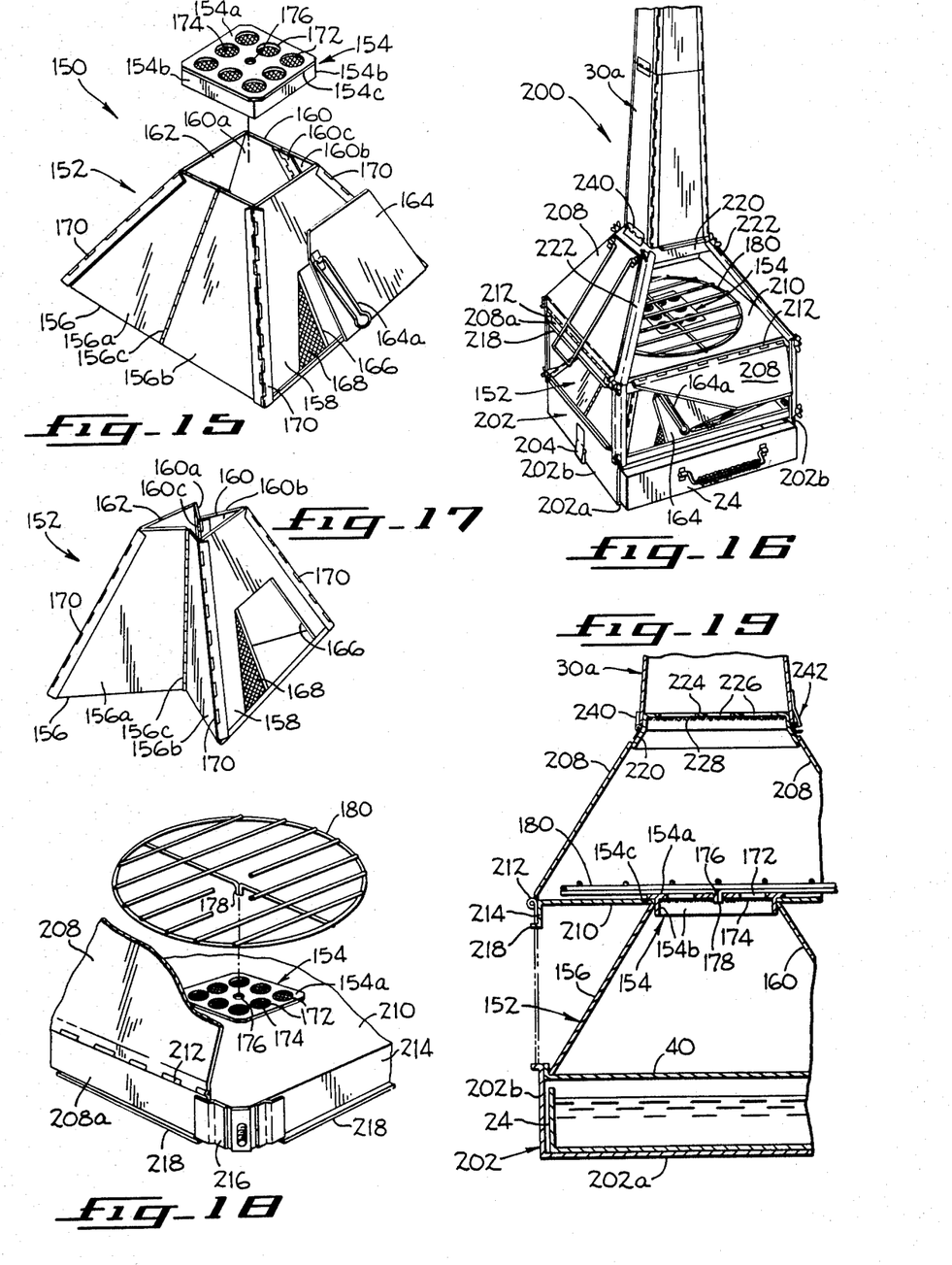
FIG. 15 is a perspective view of the basic unit of the present invention, showing the cover grill spaced vertically above the side panels for better illustration of the elements.
FIG. 16 is a fragmentary perspective view of the preferred embodiment of the present invention.
FIG. 17 is a perspective view of the side panels of FIG. 15 in their partially collapsed condition.
FIG. 18 is a fragmentary perspective view, on an enlarged scale, of a lower corner portion of the upper pyramid-shaped unit of FIG. 16, showing in detail the manner in which the side panels are removably secured to the pan, and the rotatable cooking grill spaced vertically above the cover grill of the lower pyramid-shaped unit.
FIG. 19 is a fragmentary central vertical section through the embodiment shown in FIG. 16.

FIG. 15 - BASIC UNIT

The basic unit 150 of the present invention is shown in FIG. 15. This unit 150, which is especially suitable for hikers and campers as a simple, lightweight and portable means for safely enclosing and utilizing a campfire, comprises a truncated pyramid-shaped fire box 152 and a cover grill 154 that, when in functional position, rests on top of and extends a short distance downwardly into the fire box 152 (FIG. 19).

The fire box 152 comprises four side panels 156,158,160, 162 of trapezoid configuration, and an access/damper door 164 with a latch handle 164a, that is slidably supported on the panel 158 for controlling access to the fire box interior through an opening 166, such as for inserting wood or other fuel, and for adjusting the air flow through a spark-arresting screen 168 that partially covers the opening 166. The four panels 156,158,160,162 are interconnected along their adjacent edges by four piano hinges 170 (only three shown). Each of the two opposed panels 156,160 is split vertically along its centerline into two sections 156a, 156b, and 160a,160b, respectively, and each pair of sections is pivotally interconnected by a piano hinge as illustrated at 156c,160c. Accordingly, and as represented by FIG. 17, the hinges 156c,160c, and 170 facilitate collapsing the fire box 152 into a flat, compact condition for easy transportation and storage.

The cover grill 154 comprises a flat square or rectangular plate 154a and four peripheral side flanges 154b (only two shown) that extend downwardly from the bottom surface of the plate 154a. The periphery of the plate 154a extends beyond that of the side flanges 154b to form a lip area 154c which, when the grill 154 is installed on the fire box 152, rests on the upper edges of the side panels 156,158,160,161, thereby supporting the grill 154 on the panels. As can be seen in FIG. 19, the side flanges 154b extend into the uppermost end area of the fire box 152, thereby securely yet releasably holding the fire box in its open functional condition. A plurality of openings 172 in the cover grill plate 154a allow controlled exit of smoke and heated air from the fire box, and these openings are covered by a spark-arresting screen 174. A central opening 176 in the grill plate 154a functions as a receptacle for a pivot element 178 that extends downwardly from the center of a rotatable cooking grill 180 (FIGS. 16, 18 and 19) when the grill 154 is employed in other embodiments of the invention.

FIGS. 16, 18 and 19 - PREFERRED EMBODIMENT

The preferred embodiment 200 of the present invention, illustrated in FIGS. 16, 18 and 19 is closely similar in many respects to the embodiment illustrated in FIGS. 1-3; accordingly, only the differences existent in the preferred embodiment will be described.

In the preferred embodiment 200 the support 202, which corresponds to the support 50 of FIGS. 1-3, comprises a bottom panel 202a and two upstanding side panels 202b that together form a receptacle for the water tray 24. On one side panel 202b is a clip 204 that cooperates with a flange-like retainer (not shown) to secure the support 202 to another element, such as a table 112 (FIG. 10), when the stove/heater is in stowed condition.

The side panels 208, counterparts of the side panels 62 of FIGS. 1-3, are removably secured to the cooking chamber's tray-like base 210, which corresponds to the base 60 of FIGS. 1-3, by means of flanges 208a that are pivotally connected to their panels by piano hinges 212. The flanges 208a fit between the outer surface of four flanges 214 that extend downwardly from the periphery of the base 210, and clips 216 that are fixed to the corners of the base 210, as best seen in FIG. 18. The bottom edge of each flange 214 extends outwardly as a lip 218 to support the panel flanges 208a in proper position, whereby the panels 208 can be pivoted outwardly from their illustrated position into a horizontal attitude to function as tables, as in the FIGS. 1-3 embodiment.

In this preferred embodiment the central opening in the base 210 is covered by the grill 154, and no heat diffuser 66 is employed. As explained earlier, a rotatable cooking grill 180 is pivotally supported in the center of the grill 154, and thus no grill 70 is needed in this embodiment.

In lieu of the top support frame 74 of the FIGS. 1-3 embodiment, a rectangular or square support grill 220 (FIGS. 16 and 19) is employed in the preferred embodiment. The grill 220 is supported in position by struts 222 that are closely similar to their counterparts 72, but support the grill 220 includes a top plate 224 with a plurality of holes 226 and a spark-arresting wire 228 covering its bottom surface. The lower chimney section 30a is releasably secured to the support grill 220 by a hinge 240 and clip-flange system 242, as seen in FIG. 19.

Although the best mode contemplated for carrying out the present invention has been shown and described, it will be apparent that modification and variation may be made without departing from what is regarded to be the subject matter of the invention.

I claim:
1. A portable collapsible multi-purpose stove/heater assembly comprising:
   (a) a firebox in the shape of a truncated pyramid, said firebox formed by an assembly of four trapezoidal-shaped and substantially flat side panels all of which slant inwardly to form a rectangular opening at the top of the firebox, said opening located centrally above the base of said pyramid;
   (b) means to secure the side panels together;
   (c) means to support a cooking utensil above the rectangular opening formed by the assembled side panels at the top of the firebox; and
   (d) a cooking chamber supported above the firebox, said cooking chamber comprising a rectangular-shaped and generally flat base with a central opening generally corresponding to the rectangular opening at the top of the fire box, four trapezoidal-shaped and substantially flat side panels supportable on said base for pivotal movement with respect thereto between generally upstanding and horizontal positions, and a generally rectangular upper support means spaced above the base and supported thereon by a plurality of struts extending upwardly and inwardly from the corners of said base.

2. A stove/heater assembly according to claim 1 wherein at least one of the fire box side panels has an opening for access to the interior of the fire box.

3. A stove/heater assembly according to claim 2 wherein the side panel opening is partially covered by a spark-arresting means.

4. A stove/heater assembly according to claim 2 including a door mounted on the fire box for slidable movement over the side panel opening.

5. A stove/heater assembly according to claim 1 wherein the means to support a cooking utensil comprises a plate-like cover for the rectangular opening, said cover having a plurality of openings to permit passage of smoke and heated air therethrough, and a spark-arresting means extending across said openings.

6. A stove/heater assembly according to claim 5 wherein said cover includes a plurality of fire box supporting downward extending flanges that at least partially reside within the interior of the fire box when the cover is installed thereon.

7. A stove/heater assembly according to claim 1 wherein the firebox panels are interconnected by hinge means to facilitate folding said panels into a compact arrangement.

8. A stove/heater assembly according to claim 7 wherein two of said firebox panels each comprises two panel sections interconnected by hinge means to facilitate folding said panel sections against each other, whereby the fire box can be folded in an accordion-like manner into a substantially flat condition.

9. A stove/heater assembly according to claim 1 including a generally flat fire pan beneath said fire box.

10. A stove/heater assembly according to claim 9 including a water tray slidably positioned on a support beneath the fire box to utilize heat radiating downwardly from said fire box.

11. A stove/heater assembly according to claim 9 including a plurality of struts extending between the fire pan and the cooking chamber base for supporting the cooking chamber above the fire box.

12. A stove/heater assembly according to claim 1 including means defining a leg pivotally attached to the cooking chamber side panels for supporting the side panels in a generally horizontal attitude.

13. A stove/heater assembly according to claim 1 including a plate-like heat diffuser for positioning over the central opening in the cooking chamber base.

14. A stove/ heater assembly according to claim 1 including a grill for supporting cooking utensils over the cooking chamber base.

15. A stove/ heater assembly according to claim 14 wherein said grill is supported on the cooking utensil support for rotational movement with respect thereto about a generally vertical axis.

16. A stove/heater assembly according to claim 1 wherein the upper support means includes a plate-like support for cooking utensils, said plate-like support containing a plurality of openings across which extends a spark-arresting means.

17. A stove/heater assembly according to claim 1 including chimney means supported above the cooking chamber.

18. A stove/heater assembly according to claim 17 wherein the chimney means comprises a lower chimney section releasably securable to the upper support means, and an upper chimney section releasably securable to the lower chimney section.

19. A stove/ heater assembly according to claim 18 wherein each chimney section comprises a plurality of panels pivotally interconnected to facilitate collapse of the section into a generally flat condition.

20. A stove/heater assembly according to claim 18 including fire damper means functionally attached to the chimney means.

21. A stove/heater assembly according to claim 18 including clip means on the lower chimney section, and means on the upper support means for cooperating with said clip means to releasably secure said lower chimney section to said upper support means.

22. A stove/heater assembly according to claim 18 including clip means on the upper chimney section, and means on the lower chimney section for cooperating with said clip means to releasably secure said upper chimney section to said lower chimney section.

23. A stove/heater assembly according to claim 1 including an annular warming chamber beneath the cooking chamber base and surrounding the fire box.

24. A stove/heater assembly according to claim 23 wherein the warming chamber comprises a generally flat and rectangular-shaped tray for positioning intermediate the fire box base and the cooking chamber base, and a plurality of side panels pivotally suspendable in a generally vertical attitude from said cooking chamber base to extend between said base and said tray.

25. A stove/heater assembly according to claim 24 wherein the cooking chamber is dimensioned to fit as a cover over the water tray, and all of the other components of the assembly are dimensioned to fit into the water tray and thus can be stowed therein, and the cooking chamber base installed as a cover on the tray, to achieve a compact and readily portable unit.

26. A stove/heater assembly according to claim 25 including an auxiliary work/storage table attachable to the stowed assembly unit.

27. A stove/heater assembly according to claim 26 wherein the work/storage table comprises a drawer-like base, a transparent top slidably attached to the top of the base, and compactly-stowable leg means attached to the base.

* * * * *